(12) United States Patent
Trent et al.

(10) Patent No.: US 7,696,500 B2
(45) Date of Patent: Apr. 13, 2010

(54) FUSED TEST SOURCE

(75) Inventors: Randall L. Trent, Santa Barbara, CA (US); Robert O. Wageneck, Santa Barbara, CA (US); Jason A Mazzetta, Santa Barbara, CA (US); Stephen D. Scopatz, Santa Ynez, CA (US)

(73) Assignee: Electro Optical Industries, Inc., Santa Barbara, CA (US)

( * ) Notice: Subject to any disclaimer, the term of this patent is extended or adjusted under 35 U.S.C. 154(b) by 131 days.

(21) Appl. No.: 12/077,514

(22) Filed: Mar. 20, 2008

(65) Prior Publication Data

US 2009/0236548 A1 Sep. 24, 2009

(51) Int. Cl.
*G01N 21/35* (2006.01)
*G01N 25/00* (2006.01)

(52) U.S. Cl. ............... 250/504 R; 250/495; 250/493.1; 250/339.11; 250/339.14; 374/126; 374/9

(58) Field of Classification Search ............. 250/504 R, 250/495, 493.1, 339.11, 339.14; 374/126, 374/9
See application file for complete search history.

(56) References Cited

U.S. PATENT DOCUMENTS 5,460,451 A * 10/1995 Wadman ..................... 374/126
2006/0067376 A1 * 3/2006 Katsuki et al. ................ 374/9

* cited by examiner

*Primary Examiner*—Nikita Wells
(74) *Attorney, Agent, or Firm*—James A. Hudak

(57) ABSTRACT

A test source that combines infrared energy and visible light to produce a uniform output of energy in the visible and infrared spectra is disclosed. The test source includes an infrared energy source and a visible light source. The infrared energy source has a white coating thereon. The visible light source emits visible light onto the infrared light source, which generates a combination of infrared energy and visible light outwardly into the surrounding atmosphere.

8 Claims, 5 Drawing Sheets

TWO SOURCES ON A LINEAR SLIDE

TWO SOURCES WITH BEAM COMBINER

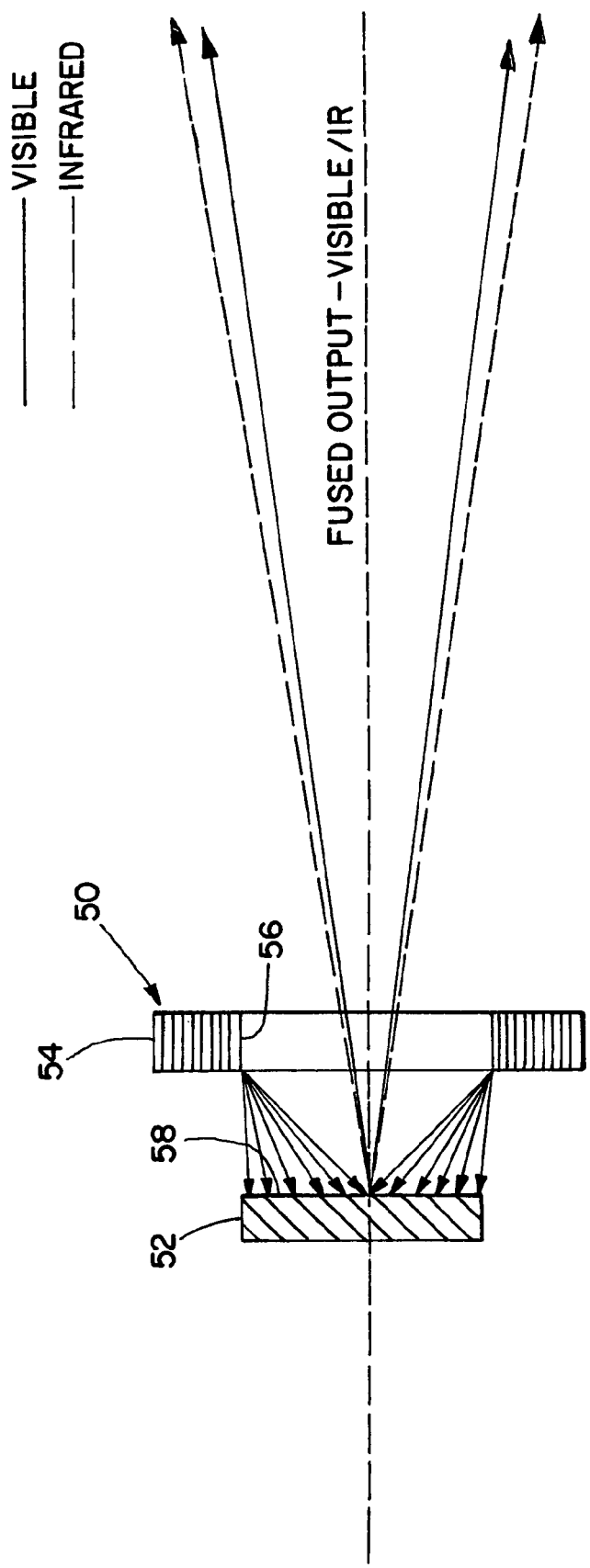

US 7,696,500 B2

FUSED TEST SOURCE

TECHNICAL FIELD

The present invention relates, in general, to a fused test source and, more particularly, to a test source that combines infrared and visible energy to produce a uniform output of energy in the visible and infrared spectra.

BACKGROUND ART

Various approaches have been taken in order to combine the outputs of an infrared energy source and a visible light source for use as a test source. One approach is to mount a blackbody that is an infrared energy source along side an integrating sphere that provides a visible light source and to laterally move these sources on a linear slide in order to direct the light from either path into the optical path toward a focal plane. Another approach is taken when these sources are oriented perpendicularly with respect to one another. In this instance, the outputs from these sources contact a beam combiner, which directs the resulting combined energy toward the optical path. Each of these approaches has inherent disadvantages with respect to spectral fidelity, ease of use, and resulting cost.

In view of the foregoing, it has become desirable to develop a test source that combines the outputs of an infrared energy source and a visible light source to produce a fused, uniform output of energy in the visible and infrared spectra while providing independent control of the visible and infrared energy levels.

SUMMARY OF THE INVENTION

The present invention solves the problems associated with the prior art approaches of combining the outputs of an infrared energy source with a visible light source by providing a test source that combines or fuses the outputs of these sources to produce a uniform output of energy in the visible and infrared spectra. The novelty of the present invention resides in the treatment of the emitting surface of an infrared source with a coating that reflects visible light while maintaining high emissivity in the infrared spectra resulting in a source with a wide usable spectral range from visible through infrared. As such, one embodiment of the present invention includes an integrating sphere and a blackbody source of infrared energy. An aperture is provided in the surface of the integrating sphere and is positioned therein so as to be oppositely disposed from the blackbody source. A white coating is provided on the inner surface of the integrating sphere and on the surface of the portion of the blackbody source that is within the integrating sphere. Visible light is introduced into the integrating sphere and contacts the inner surface thereof which cause it to be reflected to the surface of the blackbody source from which it is reflected toward and outwardly through the aperture in the integrating sphere into the surrounding environment. In another embodiment of the present invention, visible light is directed to a blackbody source which has a white coating on the surface thereof causing visible energy to be reflected and infrared energy to be emitted therefrom into the surrounding atmosphere. The result is the emission of a fused, uniform output of energy in the visible and infrared spectra permitting the apparatus to be used as a test source.

BRIEF DESCRIPTION OF THE DRAWINGS

FIG. 6 is a cross-sectional view of another embodiment of the fused test source of the present invention.

DESCRIPTION OF THE PREFERRED EMBODIMENT

Figure 1:
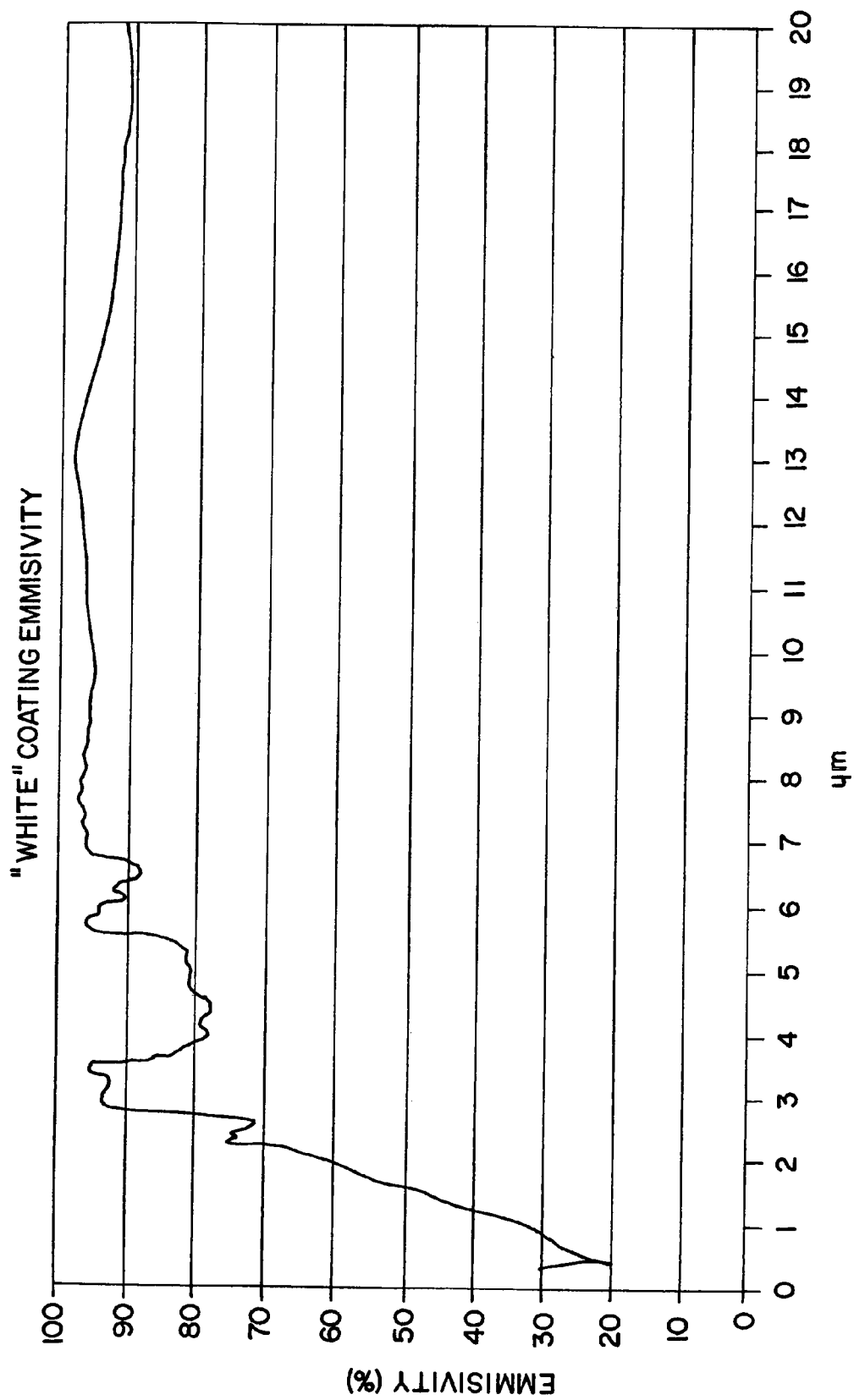
FIG. 1 is a graph of percent emissivity versus wavelength for a "white" coating.
Figure 2:
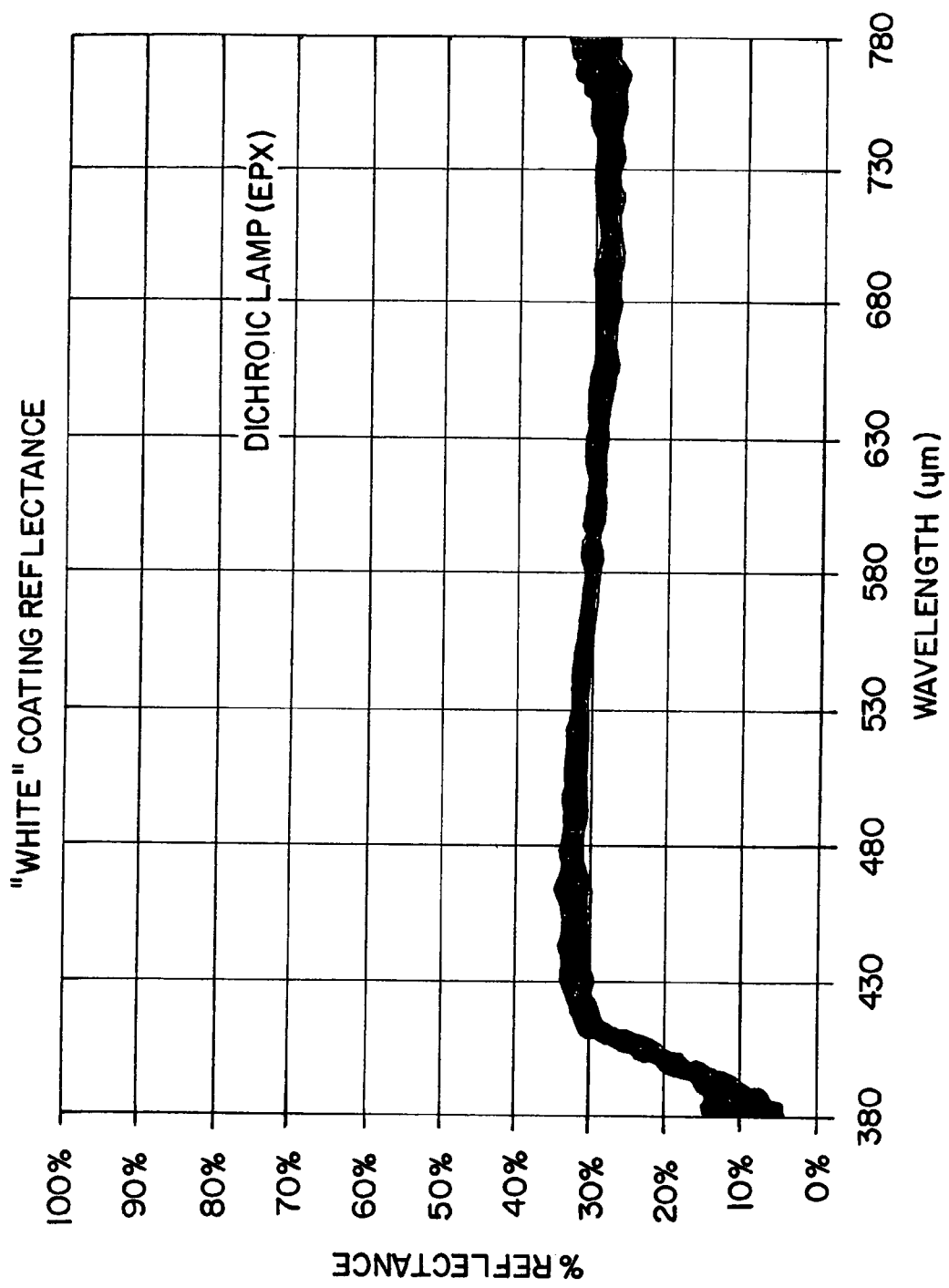
FIG. 2 is a graph of percent reflectance versus wavelength for a "white" coating.

Referring now to the drawings, FIG. 1 is a graph of percent emissivity versus wavelength in μm for a "white" coating. As can be seen, the emissivity of a "white" coating is greater than 80% in the 3-5 μm band and greater than 90% in the 7-20 μm band. Such emissivity is acceptable for an infrared energy source. Referring to FIG. 2, the percent reflectance versus wavelength in nm for a "white" coating is shown. As is illustrated, the reflectance of a "white" coating is about 30% in the visible wavelengths, which provides sufficient light to test a visible sensor.

Figure 3:
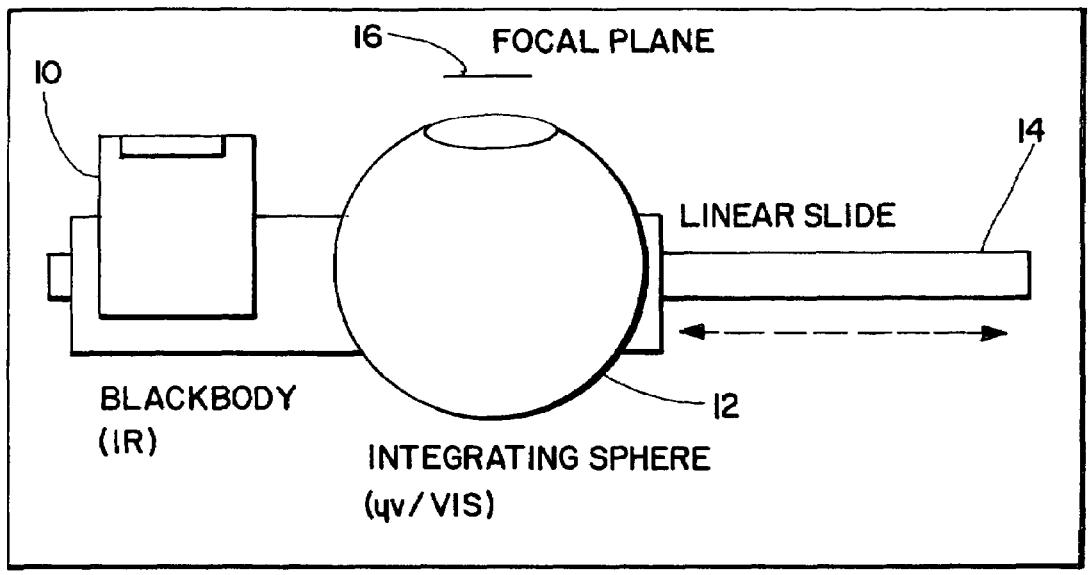
FIG. 3 illustrates a prior art approach for combining an infrared energy source with a visible light source with the sources being on a linear slide.

A classical approach for combining an infrared energy source with a visible light source is shown in FIG. 3 which illustrates a prior art approach for combining these sources when these sources are on a linear slide. In this case, a blackbody 10 which is an infrared energy source and an integrating sphere 12 which provides a visible light source are operably connected to a linear slide 14 permitting the linear movement of these sources in order to direct the energy from either source toward a focal plane 16.

Figure 4:
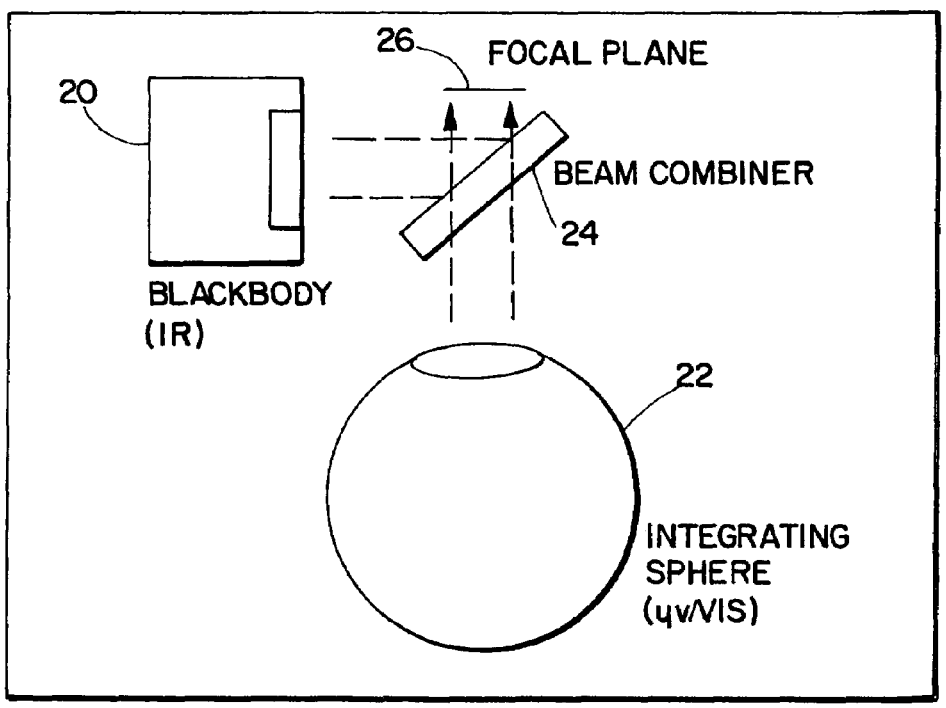
FIG. 4 illustrates a prior art approach for combining an infrared energy source with a visible light source when using a beam combining optical element.

Another classical approach for combining an infrared energy source with a visible light source is shown in FIG. 4 which illustrates a prior art approach for combining these sources when these sources are oriented at a right angle with respect to one another. In this instance, a blackbody 20 which is an infrared energy source and an integrating sphere 22 which provides a visible light source are oriented perpendicularly with respect to one another and the outputs from these sources contact a beam combiner 24 which directs the resulting combined energy toward a focal plane 26.

Figure 5:
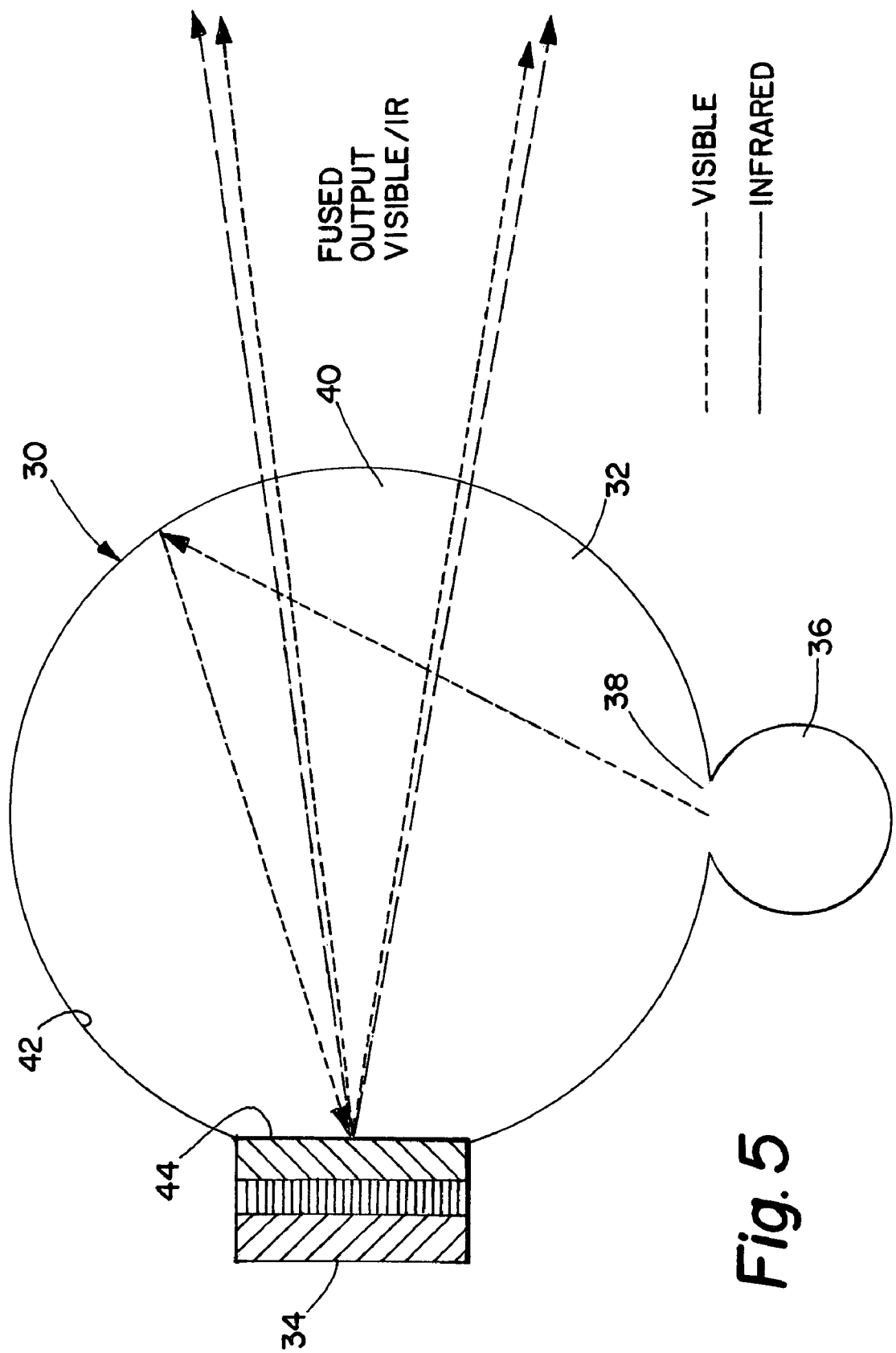
FIG. 5 is a cross-sectional view of one embodiment of the fused test source of the present invention.

Referring now to FIG. 5, a cross-sectional view of a first embodiment of a fused test source 30 of the present invention is shown. The fused test source 30 includes an infrared energy source and a visible light source that produces a combined, uniform output of energy in the infrared and visible spectra. The fused test source 30 is comprised of an integrating sphere 32, a blackbody source 34 of infrared energy, and a visible energy source 36. The output of the visible energy source 36 is adjustable. The visible energy source 36 is attached to the integrating sphere 32. An aperture 38 is provided in the visible energy source 36 permitting visible light from the source 36 to enter the integrating sphere 32. An aperture 40 is provided in the surface of the integrating sphere 32 and is positioned therein so as to be oppositely disposed from blackbody source

34. A visible energy reflectance coating is provided on the inner surface 42 of the integrating sphere 32 and on the surface 44 of blackbody source 34 that is within the integrating sphere 32. In this orientation, visible light is introduced into the integrating sphere 32 and contacts the inner surface 42 thereof which causes it to be reflected toward the surface 44 of blackbody source 34 from which it is reflected outwardly through aperture 40 in integrating sphere 32 into the surrounding environment. The result is a fused, uniform output of energy in the visible and infrared spectra being emitted from the integrating sphere 32 permitting this embodiment of the present invention to be used as a test source.

A second embodiment of a fused test source 50 of the present invention is illustrated in FIG. 6. In this embodiment, the fused test source 50 is comprised of a blackbody source 52 of infrared energy and a source 54 of visible energy. The visible energy source 54 and has an aperture 56 therethrough. The surface 58 of the blackbody source 52 has a white coating thereon. In this embodiment, visible light produced by the visible energy source 54 is directed toward the surface 58 of the blackbody source 52 from which it is reflected outwardly through aperture 56 in visible energy source 54 into the surrounding atmosphere. The result is the emission of a fused, substantially uniform output of energy in the visible and infrared spectra permitting this embodiment of the present invention to be used as a test source.

The novelty of the fused test source of the present invention resides in the treatment of the surface of the blackbody source with a white coating that reflects visible light while maintaining high emissivity in the infrared wavelengths. This results in a source with a wide usable spectral range from visible light through infrared energy, which is currently not available from a single source. The use of the fused test source of the present invention provides many advantages in the testing of fused, hyper-spectral and multi-spectral sensors. The images from these sensors can be combined into a single image that has more information and/or information of a higher quality than any of the individual images alone. For example, thermal infrared images can be combined with visual spectrum images to create a system that provides clearer images in poor visibility conditions. Thus, such sensors can be used in night vision, satellite and surveillance operations. In addition, the use of the fused test source of the present invention provides advantages over prior art methods and apparatus including spectral fidelity, ease of use, and lower cost. As previously described, current approaches typically utilize a beam combiner which alters the spectral output, or require mechanically moving the infrared energy source and the visible light source or the unit under test.

Certain modifications and improvements will occur to those skilled in the art upon reading the foregoing. It is understood that all such modifications and improvements have been deleted herein for the sake of conciseness and readability, but are properly within the scope of the following claims.

We claim:

1. A test source comprising a source of infrared energy having an emitting surface, said emitting surface being coated so as to reflect visible light while maintaining relatively high emissivity in the infrared wavelength regions; a source of visible light; and an integrating sphere having an aperture therein; wherein said infrared energy source and said visible light source each being operably attached to said integrating sphere, said visible light source emitting visible light into said integrating sphere causing said interior of said integrating sphere to reflect said visible light toward said infrared energy source which reflect a combination of infrared energy and visible light through said aperture in said integrating sphere.

2. The test source as defined in claim 1 wherein said integrating sphere has a coating on at least a portion thereof.

3. The test source as defined in claim 1 wherein said infrared energy source is a blackbody or a gray body.

4. The test source as defined in claim 1 wherein said aperture in said integrating sphere is positioned substantially opposite said infrared energy source.

5. The test source as defined in claim 2 wherein said coating reflects visible light and emits infrared energy.

6. The test source as defined in claim 1, wherein said source of visible light directs light toward said infrared energy source which emits infrared energy and reflects visible light into the surrounding atmosphere.

7. The test source as defined in claim 6 wherein said infrared energy source is a blackbody or a gray body.

8. The test source as defined in claim 6 wherein said coating reflects visible light and emits infrared energy.

\* \* \* \* \*